United States Patent [19]

Beccaris

[11] 4,210,232
[45] Jul. 1, 1980

[54] CLUTCH MECHANISMS WITH TWO CLUTCH PLATES

[75] Inventor: Carlo Beccaris, Santena, Italy

[73] Assignee: Société Anonyme Francaise Du Ferodo, Paris, France

[21] Appl. No.: 860,846

[22] Filed: Dec. 15, 1977

[30] Foreign Application Priority Data

Dec. 16, 1976 [FR] France .................. 76 37871

[51] Int. Cl.² ........................................... F16D 21/06
[52] U.S. Cl. ..................... 192/48.8; 192/70.29; 192/70.3; 192/89 B
[58] Field of Search ................. 192/48.7, 48.8, 70.29, 192/70.3, 89 B

[56] References Cited

U.S. PATENT DOCUMENTS

| | | | |
|---|---|---|---|
| 3,021,931 | 2/1962 | Holz | 192/48.7 |
| 3,215,233 | 11/1965 | Smith et al. | 192/48.7 |
| 3,590,968 | 7/1971 | Binder | 192/48.8 X |
| 3,779,353 | 12/1973 | Maucher | 192/89 B X |
| 3,791,499 | 2/1974 | Ryan | 192/89 B X |
| 3,892,302 | 7/1975 | Rist | 192/70.3 X |

FOREIGN PATENT DOCUMENTS

| | | | |
|---|---|---|---|
| 1946126 | 9/1969 | Fed. Rep. of Germany | 192/70.3 |
| 2231035 | 6/1972 | Fed. Rep. of Germany | 192/89 B |
| 2303195 | 3/1976 | France | 192/48.7 |

Primary Examiner—Allan D. Herrmann
Attorney, Agent, or Firm—Charles E. Brown

[57] ABSTRACT

Clutch mechanisms are disclosed having two clutch assemblies associated with a single or two separate output shafts. To minimize the axial dimension of the clutch mechanism and yet provide the required spring loading when the clutch assemblies act independently, for example, the spring loading is provided by two Belleville type spring washers interposed between the pressure plates of the clutch assemblies. The spring washers are arranged axially and their configurations tends to converge in the same direction. Spacer ring members are interposed between the spring washers at both their inner and outer peripheries and between each of the spring washers and the pressure plate facing it so that the spring washers are borne exclusively by the spacer ring members.

10 Claims, 6 Drawing Figures

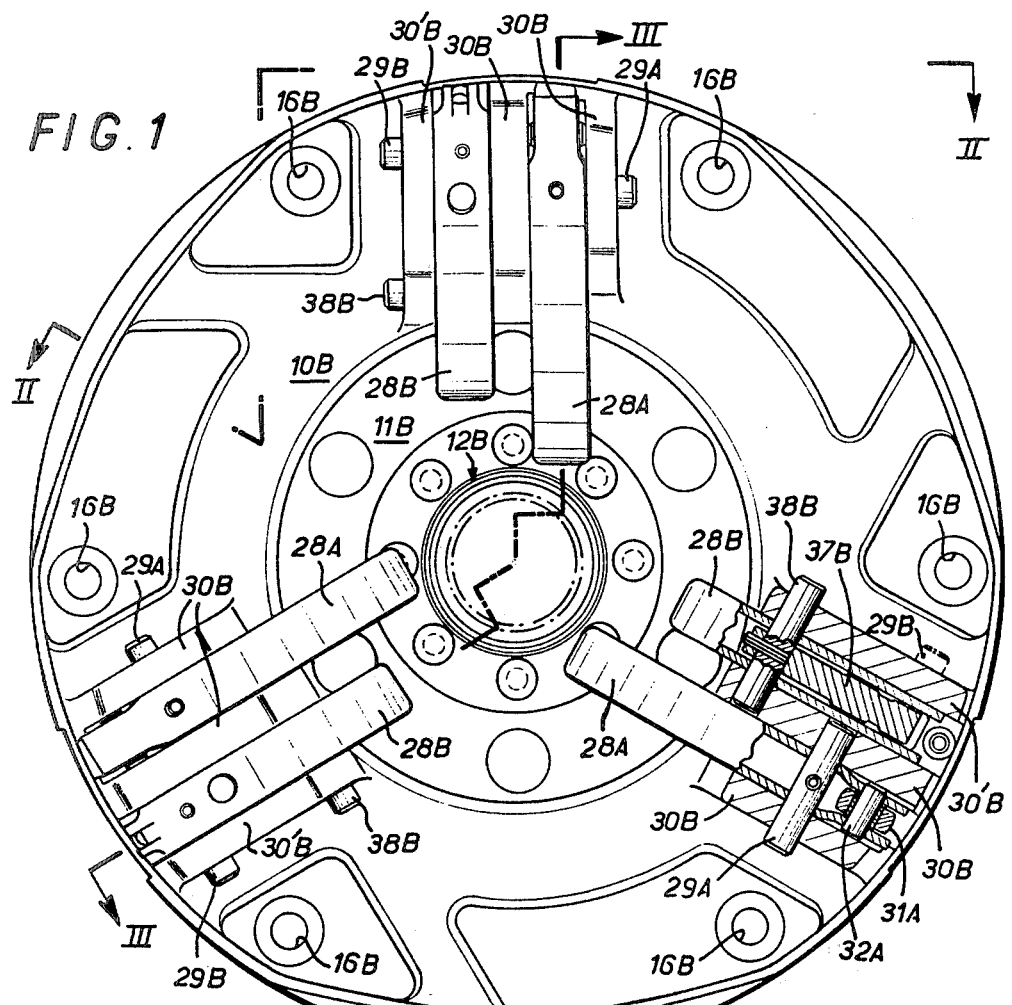
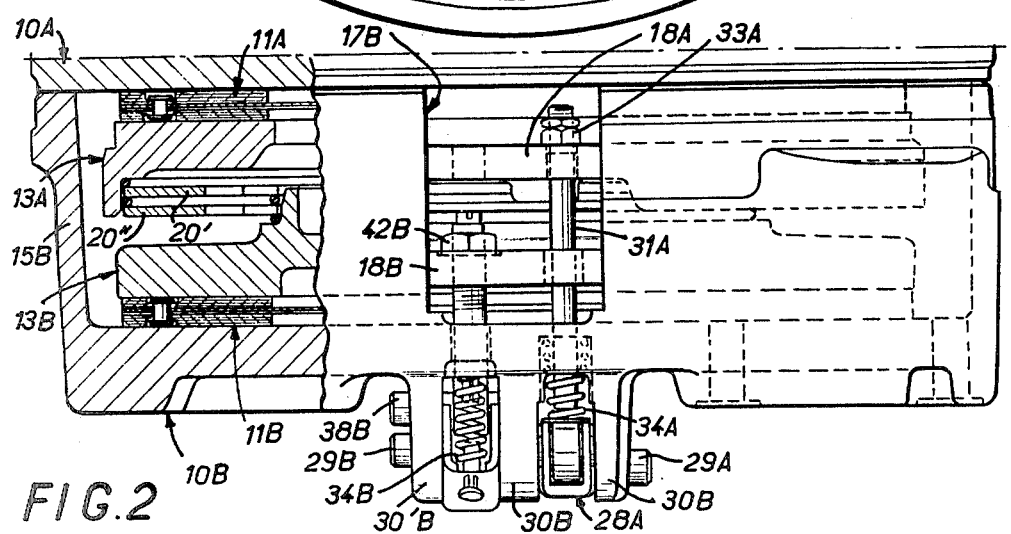

CLUTCH MECHANISMS WITH TWO CLUTCH PLATES

The present invention relates generally to clutch mechanisms having two clutch plates, whether they are double clutch assemblies with each of the clutch plates being keyed to a different output shaft, or whether they are double clutch-plate assemblies in which the clutch plates are keyed to a single output shaft.

British Pat. No. 1,444,116, granted on July 28, 1976 to the assignees of the present application, discloses a clutch mechanism generally comprising two clutch assemblies each having a first, backing (or reaction) plate adapted to be fixed for rotation with a first shaft, which is normally a driving shaft, a clutch plate mounted for axial movement with respect to the backing plate and adapted to be fixed for rotation with another shaft, which is normally a driven shaft, a second, pressure plate mounted for axial movement with respect to the backing plate and fixed for rotation therewith, and resilient means urging the pressure plate towards its clutching or engagement position in which the clutch plate is clamped or pressed between the pressure plate and the backing plate.

One of the problems to be overcome with this type of clutch mechanism resides in the construction and securement of the resilient means associated with each of the pressure plates of the clutch assemblies.

In order to reduce the axial dimensions of the clutch mechanism, the foregoing British patent disclosed arranging them together between the two backing plates, the resilient means thus being axially disposed between the pressure plate of a first of the clutch assemblies and the pressure plate of the second of the clutch assemblies, said resilient means being formed as Belleville spring washers.

Yet such a spring washer is not capable of handling anything more than relatively light loads. Besides, in double clutch mechanisms, bearing in mind the load characteristics for seating a diaphragm spring, the declutching of one of the two clutch plates leads to a reduction of the loading on the other clutch plate. Slipping of the other clutch plate may occur and thereby a poor torque transmission of the applied torque thereto, and untimely overheating the clutch mechanism.

Conversely, if, in order to prevent the slipping of one of the clutch plates during declutching, a Belleville spring washer is utilized having a spring characteristic sufficient so that an appropriate load is certain to be exerted at that time against the other clutch plate, this Belleville spring washer exerts an excessive load against the clutch plates outside declutching periods. To overcome this drawback it has been contemplated to associate two Belleville washers together.

A first construction of this type was taught by British Pat. No. 965,139, granted on July 29, 1964, the Belleville spring washers are oriented axially in the opposed directions and spacing means interposed therebetween, which spacing means are, in practice, ring members having substantial axial dimensions.

Such an arrangement does not avoid producing a rather considerably axially bulky assembly of Belleville spring washers and the spacing means which keep them apart.

Further, for a given force, this arrangement produces double the clutch travel. Finally, in order to avoid the likelihood of instability, this arrangement normally necessitates the utilization of absolutely identical Belleville spring washers.

In another arrangement disclosed in U.S. Pat. No. 3,791,499 issued on Feb. 12, 1974 relative to a clutch having a pair of clutch plates and a single output shaft, spring washers are axially oriented to converge in the same direction, with spacing means comprised of two spacer ring members interposed therebetween.

Still, the clutch so constructed, of reduced overall axial dimension, extends, in practice, beyond the assembly made up of the backing plate, the pressure plates, and the clutch plates, which results in a corresponding axial extension beyond the actual clutch mechanism.

Moreover, the arrangement which characterizes the construction is not applicable, without undue complications, to double clutches because it necessitates the use of levers or other return members.

An object of the present invention is to provide a clutch mechanism of the foregoing kind which reconciles the advantages of both of the briefly analysed arrangements, without their attendant drawbacks.

According to the invention there is provided a clutch mechanism of the aforementioned type in which the resilient means include at least two Belleville type spring washers in nested relation and converging in the same general direction; spacer ring members are interposed between said spring washers, one said spacer ring member being disposed proximate to the inner peripheries of said spring washers, and the other said spacer ring member being disposed proximate to the outer peripheries of said spring washers; and said spring washers coact with each other and are disposed axially between said backing plate of one clutch assembly and the backing plate of the other clutch assembly.

Preferably another spacer ring member is interposed between one spring washer and the pressure plate of one of the clutch assemblies and still another spacer ring member is disposed between the other spring washer and the pressure plate of the other clutch assembly so that the spring washers bear exclusively against the spacer ring members.

Thus, the clutch mechanism according to the invention which itself is capable of producing a considerable load is of advantageously reduced axial dimension.

These and other features and advantages of the invention will become more apparent from the description which follows, given by way of example, with reference to the accompanying schematic drawings, in which:

FIG. 1 is an end view of a clutch mechanism embodying the present invention, with parts broken away;

FIG. 2 is, in part, a sectional view and, in part, a side view, taken along the broken line II—II in FIG. 1;

The drawings illustrate the invention as an independently controlled double output clutch mechanism, i.e., a so-called double clutch mechanism capable of independently controlling each of two separate output shafts and having a single driving or input shaft. Such a clutch mechanism comprises two clutch assemblies A and B disposed axially one behind the other.

Figure 3:
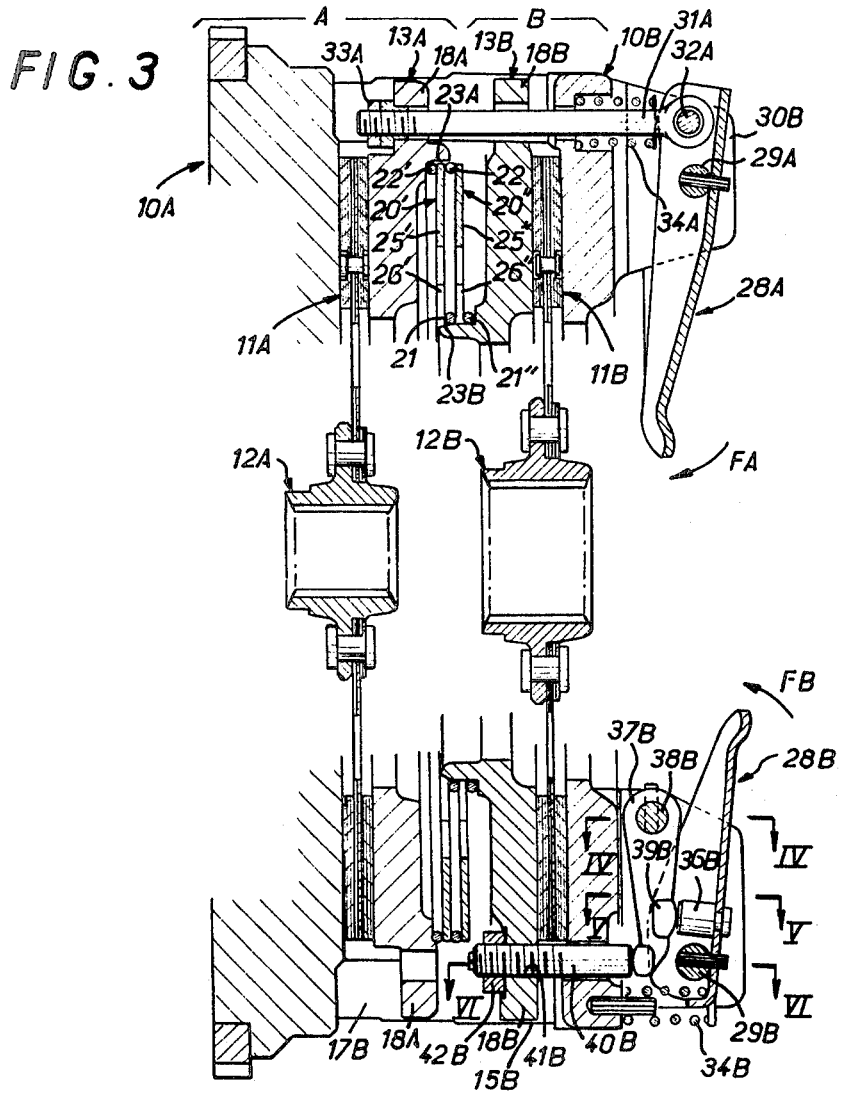
FIG. 3 is an axial sectional view taken on the broken line III—III in FIG. 1.
Figure 4:
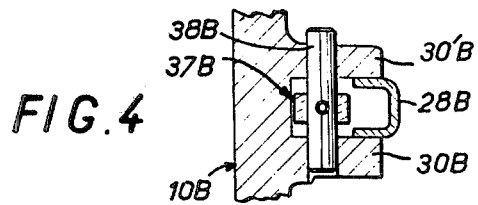
FIGS. 4, 5 and 6 are three details viewed in section taken on lines IV—IV, V—V and VI—VI of FIG. 3.
Figure 5:
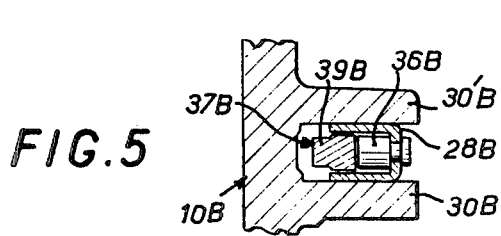
Figure 6:
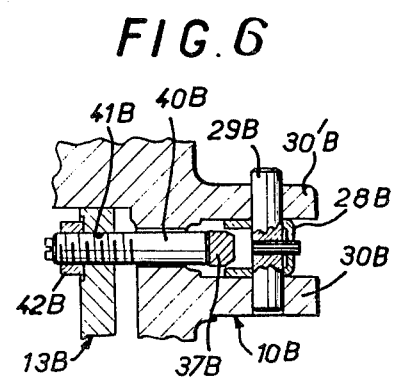

The clutch assemblies comprise, in succession, from left to right in FIG. 3, clutch assembly A followed by clutch assembly B, respectively comprising backing or reaction plates 10A, 10B, clutch plates 11A, 11B fixed to hubs 12A, 12B and axially movable with respect to the backing plates 10A, 10B and pressure plates 13A, 13B joined for rotation with the backing plates 10A, 10B and mounted for axial movement with respect to the same for clamping the corresponding clutch plates 11A, 11B.

The backing plate 10A defines a flywheel and, by means not viewable in drawings and known per se, is adapted to be coupled for rotation with a first shaft, usually the driving or input shaft, while the hubs 12A, 12B of the clutch plates 11A, 11B are each adapted to be coupled for rotation with another shaft, usually the driven or output shaft, the hubs 12A, 12B being provided, for this purpose, with splines along their internal peripheries for mating engagement with splines on such a shaft.

As the clutch mechanism of the illustrated embodiment has two output shafts, each of the clutch plates 11A, 11B is keyed for rotation with a different driven shaft.

The backing plate 10B has at its periphery a substantially cylindrical skirt 15B which surrounds the peripheries of the clutch plates 11A, 11B and the pressure plates 13A, 13B and is in axial contact with the backing plate 10A. Screws, not shown, extend through passageways 16B in the backing plate 10B, fixing the same to the backing plate 10A.

Laterally, the skirt 15B of the backing plate 10B has, at spaced intervals, cutouts 17B into which radial tabs 18A, 18B on the pressure plates 13A, 13B protrude, the tabs 18A, 18B being in axial sliding engagement in the cutouts 17B thereby ensuring the rotatable connection of the pressure plates 13A, 13B with an assembly comprised of the backing plates 10A, 10B while accommodating an axial displacement of the pressure plates relative to the backing plates.

Between the pressure plates 13A, 13B, which are surrounded by the backing plates 10A, 10B and disposed opposite each other, are provided common resilient means adapted to urge the pressure plates 13A, 13B towards an engagement or clutching position in which the clutch plates 11A, 11B are pressed between the pressure plates 13A, 13B and the corresponding backing plates 10A, 10B, as illustrated in FIG. 3.

According to the invention and the illustrated embodiment, the resilient means comprise two Belleville spring washers 20', 20" which are generally coaxial and converge in the same direction. The Belleville spring washers are nested axially with spacing means interposed therebetween. The spacing means are simply formed as two toroidal or spacer ring members 21, 22; the spacer ring member 21 is located in the vicinity of the inner periphery of the spring washers and the spacer ring member 22 is located at the outer periphery thereof.

The spring washers 20', 20" which coact are axially disposed between the pressure plate 13A, at the outer periphery of which bears the spring washer 13B acting through a spacer ring member 22'; the spring washer 20", which acts through a spacer ring member 21", bears against the pressure plate 13B at the inner periphery thereof.

Thus, each spring washer 20', 20" is advantageously in contact with only the spacer ring members insofar as both their relative spacing and their bearing contact with the pressure plates 13A, 13B are concerned. This reduces the friction in the course of disengagement of the clutch and thereby the force required for declutching. Owing to their resilience and their generally circular radial or transverse cross section, the spacer ring members, in the process of declutching, effectively roll on the surfaces of the spring washers and on the surfaces of the pressure plates.

For accommodating and guiding the spring washers 20', 20" the pressure plates 13A, 13B each comprise an annular recess 23A, 23B.

In the illustrated embodiment, the spring washers 20', 20" each comprise, at their outer periphery a continuous annular portion 25', 25" and, at their inner periphery, a divided annular portion 26', 26" forming radial fingers; as a variant the spring washers may be devoid of all such radial fingers.

A set of preferably three release levers 28A, in the preferred embodiment, is associated with the clutch assembly A. Each of the release levers 28A is keyed for pivotal movement on a pintle 29A carried by lugs 30B provided on the outer face of the backing plate.

The release levers 28A extend substantially radially, and at their free ends closest to the axis of the assembly there is usually provided a release bearing mounted for axial movement, not shown in the drawings.

At their free ends farthest from the axis of the assembly, the release levers 28A are attached to the pressure plate 13A by the tie bolts 31A which are articulated at 32A to the release levers 28A and axially extend loosely through the backing plate 10B, the pressure plate 13B and the pressure plate 13A; the tie bolts 31A carry nuts 33A by which they are in contact with the far side of the pressure plate 13A.

A spring 34A is received on each of the tie bolts 31A, interposed between the backing plate 10B and the corresponding release lever 28A.

Likewise, release levers 28B are associated with the clutch assembly B, and are three in number in the illustrated embodiment; each release lever 28B is paired with one of the release levers 28A. Each of the release levers 28B is pivoted on a pintle 29B carried by one of the lugs 30B associated with the release lever 28A; a third lug 30'B is provided on the outer face of the backing plate 10B, parallel to the lugs 30B.

The release levers 28B extend substantially radially and, for operation, they are usually associated with a release bearing mounted for axial movement at their free end closest to the axis of the assembly, not illustrated in the drawings.

Between their free ends and the pintles 29B, the release levers 28B carry protuberances 36B by which the release levers contact the intermediate levers 37B which are keyed for pivotal movement on pintles 38B carried by the same lugs 30B, 30'B on the backing plate 10B which carry the pintles 29B of the corresponding release levers 28B, therebelow.

At the free end of each intermediate lever 37B beyond a boss 39B by which it is in contact with the protuberance 36B on the release lever 26B bears a plunger 40B which freely extends through the backing plate 10B and is threadedly engaged in a tapped hole 41B in the pressure plate 13B, cooperating therebeyond with a lock nut 42B.

Further, and as above, a coil spring 34B is provided between each release lever 28B and the backing plate 10B.

When, actuated by the release bearing associated therewith, the release levers 28A are swung clockwise, in the direction of the arrow FA in FIG. 3, the release levers 28A exert, through the tie bolts 31A, a traction force on the pressure plate 13A which then moves out of contact with the backing plate 10A against the force of the spring washers 20', 20". The clutch plate 11A is then unclamped and the corresponding driven shaft is no longer rotatably fixed to the driving shaft on which the backing plate 10A is keyed.

When the release bearing ceases to act on the release levers 28A, the spring washers 20', 20" once again cause the clamping of the clutch plate 11A, and, in cooperation with the springs 34A, the return of the release levers 28A to their initial positon.

Similarly, when, under the operation of the release bearing associated therewith, the release levers 28B are pivoted counterclockwise, in the direction of arrow FB in FIG. 3, the release levers 28B pivot, in turn, the intermediate levers 37B associated therewith in the opposite direction of pivotal movement. Through the plungers 40B against which the intermediate levers 37B act the axial retraction of the pressure plate 13B is produced which, moving away from the backing plate 10B under the force of the spring washers 20', 20", frees the clutch plate 11B. The clutch plate 11B is thus unclamped and the corresponding driven shaft is no longer fixed for rotation with the driving shaft on which the backing plate 10B is keyed.

When the associated release bearing ceases to act on the release levers 28B, the spring washers 20', 20" once again cause the clamping of the clutch plate 11B as well as the return of the intermediate levers 37B to their initial position and, in cooperation with the springs 34B, the return of the release levers 28B to their initial position.

Of course the release bearings associated with the release levers 28A, 28B can operate the same, simultaneously.

The present invention is, moreover, not limited to the particular embodiment described and illustrated herein but encompasses all alternatives, modifications and expedients, namely with regard to the spacer ring members interposed between the spring washers 20', 20". Instead of having transverse cross sections of constant diameter they may be of different diameters, so as to appropriately modulate the composite load due to the spring washers 20', 20". Furthermore, to better adapt the spring washers to the particular working conditions they may have different operating characteristics.

Finally, the present invention has been described with regard to a so-called double clutch mechanism having two output shafts, but it is equally suitable for clutch mechanisms with two clutch plates keyed to a single output shaft.

What is claimed is:

1. A clutch mechanism of the kind comprising two clutch assemblies, each said clutch assembly having a first plate adapted to be fixed for rotation with one shaft, a clutch plate mounted for axial movement with respect to said first plate and adapted to be fixed for rotation with another shaft, a second plate mounted for axial movement with respect to said first plate and fixed for rotation therewith, resilient means for urging said second plate to an engagement or clutching position in which said clutch plate is clamped between said first and second plates;
   wherein the improvement comprises said resilient means including at least two Belleville type spring washers in nested relation and converging in the same general direction;
   two spacer ring members interposed between said spring washers, one said spacer ring member being disposed proximate to the inner peripheries of said spring washers, and the other said spacer ring member being disposed proximate to the outer peripheries of said spring washers, said two spacer ring members being the sole means of interconnection between said spring washers;
   said spring washers coacting with each other and being disposed axially between said second plate of one said clutch assembly and said second plate of the other said clutch assembly.

2. A clutch mechanism according to claim 1, wherein another spacer ring member is disposed between each said spring washer and its associated said second plate so that said spring washers are in contact with said spacer ring members only.

3. A clutch mechanism according to claim 1, wherein the spring characteristics of said spring washers are different from each other.

4. A clutch mechanism according to claim 1, wherein said one shaft is a driving shaft and said other shaft is a driven shaft.

5. The clutch mechanism according to claim 1 wherein said spacer ring members are of circular transverse cross section whereby said spacer ring members effectively roll on surfaces of said spring washers and said second plates in the course of operation.

6. A clutch mechanism according to claim 1, wherein there is a radial clearance around the outer peripheries of said spring washers.

7. A clutch mechanism comprising two clutch assemblies arranged in axial alignment one behind the other, each said clutch assembly including a backing plate adapted to be fixed for rotation with a first shaft, a clutch plate mounted for axial movement with respect to said backing plate and adapted to be fixed for rotation with a second shaft, a pressure plate mounted for axial movement with respect to said backing plate and fixed for rotation therewith, said clutch plate being disposed axially between said backing plate and said pressure plate; resilient means for urging said pressure plates towards said backing plates for clamping said clutch plates therebetween;
   wherein the improvement comprises said resilient means including two Belleville type spring washers oriented so that their configurations tend to converge in the same general direction;
   two spacer ring members interposed between said spring washers, one said spacer ring member being disposed proximate to the inner peripheries of said spring washers and the other said spacer ring member being disposed proximate to the outer peripheries of said spring washers; and
   two other spacer ring members respectively interposed between one said spring washer and said pressure plate of one of said clutch assemblies, and the other said spring washer and said pressure plate of the other of said clutch assemblies so that said spring washers bear exclusively against said spacer ring members.

8. The clutch mechanism according to claim 7, wherein said spring ring members are of circular transverse cross section whereby said spacer ring members effectively roll on surfaces of said spring washers and said pressure plates in the course of operation.

9. The clutch mechanism according to claim 9, wherein said other two spacer ring members are respectivley at the inner and outer peripheries of their associated said spring washers.

10. A clutch mechanism according to claim 7, wherein there is a radial clearance around the outer peripheries of said spring washers.

* * * * *